United States Patent
Ludsteck et al.

(10) Patent No.: US 7,219,495 B2
(45) Date of Patent: May 22, 2007

(54) HYDRAULIC CYLINDER

(75) Inventors: Sven Ludsteck, Reichenbach (DE); Dieter Gebauer, Geldersheim (DE); Boleslaw Tulaczko, Schonungen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 22 days.

(21) Appl. No.: 11/103,869

(22) Filed: Apr. 12, 2005

(65) Prior Publication Data

US 2005/0268608 A1 Dec. 8, 2005

(30) Foreign Application Priority Data

| Jun. 4, 2004 | (EP) | ................... | 04013224 |
| Jun. 4, 2004 | (EP) | ................... | 04013225 |

(51) Int. Cl.
*B60T 11/30* (2006.01)
*B60T 11/236* (2006.01)

(52) U.S. Cl. .................. 60/584; 60/588; 92/165 PR
(58) Field of Classification Search ............... 60/584, 60/585, 586, 587, 588; 92/165 PR
See application file for complete search history.

(56) References Cited

U.S. PATENT DOCUMENTS

| 4,359,869 | A | * | 11/1982 | Ideta ..................... 60/547.3 |
| 4,781,026 | A | * | 11/1988 | Kuromitsu ................ 60/588 |
| 4,896,584 | A | | 1/1990 | Stoll et al. |
| 4,945,728 | A | * | 8/1990 | Coleman ................. 60/588 |
| 4,945,729 | A | | 8/1990 | Hayashida et al. |
| 5,161,376 | A | * | 11/1992 | Hartmann ............... 60/588 |
| 5,794,512 | A | | 8/1998 | Prosch et al. |
| 6,272,858 | B1 | * | 8/2001 | Takano et al. ........... 60/588 |
| 6,336,329 | B1 | * | 1/2002 | Adler et al. ............. 60/588 |
| 6,378,304 | B1 | * | 4/2002 | Angione ................. 60/588 |
| 6,581,380 | B2 | * | 6/2003 | Dangel et al. ........... 60/588 |
| 6,584,771 | B2 | | 7/2003 | Keller et al. |
| 6,732,517 | B2 | | 5/2004 | Zehnder, II et al. |
| 6,769,254 | B2 | * | 8/2004 | Heller et al. ............ 60/588 |
| 7,059,128 | B2 | * | 6/2006 | Rammhofer ............. 60/588 |
| 2003/0172651 | A1 | | 9/2003 | Zehnder, II et al. |
| 2004/0020201 | A1 | | 2/2004 | Feigel et al. |

FOREIGN PATENT DOCUMENTS

| DE | 199 53 286 | 5/2001 |
| DE | 103 21 288 | 12/2003 |
| EP | 1 391 615 | 2/2004 |
| FR | 1 335 901 | 8/1963 |
| GB | 2 286 049 | 8/1995 |

* cited by examiner

*Primary Examiner*—Thomas E. Lazo
(74) *Attorney, Agent, or Firm*—Cohen Pontani Lieberman & Pavane LLP

(57) ABSTRACT

A hydraulic cylinder includes a housing having a fluid connection for connecting to a hydraulic system and an after-running connection for connecting to a fluid after-running vessel, and a piston which is axially displaceable in the housing to define a variable pressure space having a gas collecting portion, the piston being fixed against rotation in the housing and having at least one after-running groove which is oriented substantially toward the gas collecting portion. A primary seal arranged in the housing and receiving the piston therethrough is bridged by the after-running groove when the piston is in an extended end position, whereby the gas collecting portion of the pressure space communicates with the after-running connection when the piston is in the extended end position.

15 Claims, 3 Drawing Sheets

HYDRAULIC CYLINDER

BACKGROUND OF THE INVENTION

1. Field of the Invention

The invention is directed to a hydraulic cylinder including a housing having a fluid connection for connecting to a hydraulic system and an after-running connection for connecting to a fluid after running vessel, a piston which is axially displaceable in the housing to define a variable pressure space, a seal isolating the pressure space from the atmosphere, and an after-running groove which bridges the seal when the piston is in an extended end position.

2. Description of the Related Art

A hydraulic cylinder of the type mentioned above, such as is applied, for example, in automotive engineering in hydraulic clutch systems or brake actuation systems, is known, e.g., from U.S. Pat. No. 6,584,771.

The housing of the hydraulic cylinder shown in the above-cited publication has, at its end side, a connection for a pressure line and, at its jacket surface, a connection with an after-running channel extending therein for connecting to an after-running vessel. A separate, ring-shaped after-running device is arranged at the end side of the cylinder piston facing the pressure space and twelve axial after-running grooves (snifting grooves) are uniformly distributed at the outer and inner circumferential surfaces of this after-running device so as to cooperate jointly with the after-running channel, an after-running area and a primary seal arranged in the cylinder.

With the piston in its extended end position in which the pressure space has its maximum volume, the after-running grooves bridge the seal which is fastened in the housing and which contacts the piston. Accordingly, on the one hand, hydraulic fluid can flow from the after-running vessel into the pressure space and, on the other hand, gas bubbles that have collected in the venting groove can escape through the after-running channel. When the piston is displaced in the direction of the pressure space, fluid that has been displaced from the pressure space will be conveyed into the after-running channel again as long as the fluid connection via the after-running grooves is open, so that gas bubbles still located in the pressure space can also escape. In this way, the pressure space of the hydraulic cylinder is vented automatically with each stroke.

In order to improve the venting behavior, DE 199 53 286 A1 proposes a hydraulic cylinder with after-running grooves that are arranged at the piston and a venting groove that is formed at the cylinder housing along the inside of the pressure space. The base of the venting groove slopes upward toward the venting channel or after-running channel relative to a horizontal of the intended installation position of the cylinder. Due to this construction, gas bubbles located in the pressure space can collect in the geodetically highest venting groove and are simply guided out of the area near the end position of the piston via the venting channel or after-running channel.

It is disadvantageous in the known hydraulic cylinders on the whole that, in spite of the plurality of compensating grooves, a venting of the pressure space is nevertheless inadequate when installed horizontally as is usual. As a result, a portion of the gases that have collected in the venting groove remains in the pressure space and, when the piston is actuated accompanied by a reduction of the pressure space, these gases are compressed and accordingly cause an undesirably long idle path and dead time in the hydraulic actuation system.

DE 199 15 832 A1 discloses a hydraulic cylinder with a piston travel sensor. The piston-cylinder unit, which is a master cylinder in this example, is activated by means of a brake pedal or clutch pedal that communicates with the piston rod of the cylinder. The hydraulic pressure generated in the master cylinder is transmitted via a line system filled with hydraulic fluid to a slave cylinder which causes a displacement of a working piston and, in this way, can actuate a clutch release, for example. Further, the piston-cylinder unit mentioned above has a sensor system which serves to detect the position of the piston inside the cylinder. For this purpose, a ring groove which is open toward the inner wall of the cylinder is formed at the outer circumference of the piston and a ring-shaped permanent magnet is arranged at the ring groove and is axially displaceable with the piston along the inner wall of the cylinder. Fastened to the outer wall of the cylinder housing is a receiving part in which are arranged two Hall switches whose axial distance corresponds to a starting position and end position of the piston and which respond to the magnetic field of the permanent magnets located at the piston and trigger a switching process or an electric signal when the permanent magnet passes by. The receiving part has an electric connection contact part for conveying the signal to control structures.

The above-cited publication does not specify how the permanent magnet is fastened to the piston. However, judging from the drawing, it can be assumed that the piston is manufactured in a first work step and the ring magnet is slid into the ring groove of the piston from the side of the piston remote of the pressure space in another work step. It is disadvantageous that even with the greatest care it cannot be ruled out in this assembly of the piston and permanent magnet that the permanent magnet will subsequently detach from its mounted position at the piston due to sudden, shock-like loading of the piston so that detection of the position of the piston cannot carried out successfully. In extreme cases, the permanent magnet may burst resulting in blockage of the piston and therefore in failure of the hydraulic system. It is apparent in the sensor system that the Hall switches are only arranged at a circumferential position, while the permanent magnet is symmetric with respect to rotation, which, because the piston can freely rotate about its longitudinal axis, is usually carried out in this way so that the piston can generate a signal in every rotational position.

SUMMARY OF THE INVENTION

The problem upon which the invention is based is to design a hydraulic cylinder of the type mentioned in the beginning in such a way that an improved degassing of the pressure space is possible.

According to the invention, the variable pressure space has a gas collecting portion, the piston being fixed against rotation in the housing and having at least one after-running groove which is oriented substantially toward the gas collecting portion.

The invention is based on the insight that while the fluid displaced by the piston in a hydraulic cylinder known from the prior art having a plurality of compensating grooves distributed along the circumference can exit from the pressure space through the compensating grooves during a piston movement accompanied by a reduction of the pressure space, the gas that has collected at the top geodetically in a gas collecting area inside the pressure space can only be guided out to a limited extent via the compensating grooves closest to the piston in an installation position deviating from the vertical, e.g., in an approximately horizontal installation position of the cylinder. This is because the hydrostatic pressure of the after-running fluid acting on the gas acts against the relatively low gas pressure prevailing therein and accordingly prevents the gas from escaping completely. Consequently, the fluid exiting from the pressure space flows out mostly via the compensating grooves not adjoining the gas collecting space.

The inventors have deduced from this fact that the pressure acting on the collected gas when the piston slides in must be increased by forming the after-running means substantially in the area of a gas collecting portion, thereby increasing the effective cross section of the after-running means, preferably greater by a multiple, in the area of the gas collecting portion than outside this area. Since the volume configuration of the gas that is compressed during a venting process undergoes a certain change, the area of the gas collecting portion in a radial section of a hydraulic cylinder extends directly to the gas collecting portion itself and to an area closely adjoining the latter in circumferential direction. Accordingly, when the after-running means are suitably dimensioned, the fluid displaced by the piston is forced to exit the pressure space chiefly in the area of the gas collecting portion. In this way, the fluid pressure and the gas pressure inside the pressure space can increase sharply for a brief time which, at the same time, leads to a considerable increase in the flow-out rate of gas and fluid so that gases can be effectively pressed out of and escape from the pressure chamber. It is essential that the after-running means are substantially, i.e., the greater part of the after-running cross section, concentrated at the gas collecting portion in order to generate the desired fluid flow at this location.

The inventors have further recognized that in order to ensure a direct flow connection between the gas collecting portion and the after-running channel it is necessary to sharply limit rotation of the piston or of the after-running means out of the area of the gas collecting portion. This is because even when there is a large number of, e.g., twelve, compensating grooves arranged at the circumference of the piston, there is a relatively large angular spacing of these grooves, e.g., 30° in the example, so that it is not possible to achieve a direct flow connection to the gas collecting space in every rotational position of the piston. Specifically, in an approximately horizontal operating position, e.g., in a hydraulic clutch actuation system corresponding to the prior art, the gas collecting portion is concentrated in a very confined sector of a hydraulic cylinder.

On this basis, the after-running means are arranged so as to be fixed with respect to rotation relative to the gas collecting portion. This can be realized, for example, by means of a guide groove in the housing and a projection at the piston that engages in this guide groove.

Therefore, the invention departs from the method proposed in the prior art, in which as many compensating grooves as possible are formed at the piston and the latter are arranged in the hydraulic cylinder so as to be substantially freely rotatable with the piston around the longitudinal axis thereof.

With the hydraulic cylinder according to the invention, gas that accumulates, for example, as the result of removing gas from the hydraulic fluid or that is injected by a slave cylinder, is guided out of the pressure space in a particularly reliable manner.

The after-running means are preferably constructed as open compensating grooves at the piston, so that the gas accumulating at the highest point of the pressure space can be guided out directly, i.e., substantially without detour, through the groove or grooves.

Venting can be achieved in a particularly effective manner, when only one individual after-running groove is formed at the piston. In this way, the fluid that is displaced during a piston movement is guided out completely via the one groove and can entrain gas residues in a particularly effective manner when flowing out.

Another advantageous improvement of venting can be achieved by forming the gas collecting portion as a venting groove extending in the housing along the pressure space and accordingly restricting it to a predetermined portion of the pressure space. In a hydraulic cylinder arranged in a motor vehicle, because of vibrations caused by operation, the gases can automatically move toward and concentrate in the area arranged inside the pressure space at the geodetically highest point in the operational position of the cylinder.

When the base of the venting groove is shaped so as to slope upward toward the after-running channel relative to a horizontal of the given installation position of the housing, the gas bubbles accumulate in an axial area directly at the primary seal so as to further substantially facilitate escape via the after-running means.

The primary seal is preferably constructed as a ring lip seal, whose open ring groove is covered relative to the venting groove by a cover element. This prevents gas bubbles from passing into and collecting in the ring groove and, at the same time, ensures that gas is guided out of the pressure space exclusively through the after-running means.

For a quick discharge of gas, the after-running means is preferably arranged at substantially the same circumferential position as the after-running channel.

In a further development of the invention, the compensating channel is formed inside the spatially limited after-running area and a secondary seal acting between the housing or guide pipe and the piston is inserted on the side remote of the pressure space.

It is a further object of the invention to provide a hydraulic cylinder with an improved and more economical sensor system.

This aspect proceeds from the insight that in a hydraulic cylinder known from the prior art having a sensor system the permanent magnet is constructed in a ring-shaped manner and is arranged symmetric to the center axis of the piston only because the piston can rotate substantially freely around this center axis. Further, in order to generate an acceptable signal, the magnet arranged at the piston must be located within the detection range of one or more sensors arranged at the outer side of the cylinder housing at a determined, fixed circumferential position in every rotational position of the piston.

When the permanent magnet is arranged asymmetrically at the piston so as to be fixed with respect to rotation relative to, as is proposed by the invention, the magnet can be many times more compact, i.e., can have substantially smaller dimensions. At the same time, the sensor system, particularly the size of the sensor, can also be reduced.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to

DETAILED DESCRIPTION OF THE PRESENTLY PREFERRED EMBODIMENTS

Figure 1A:
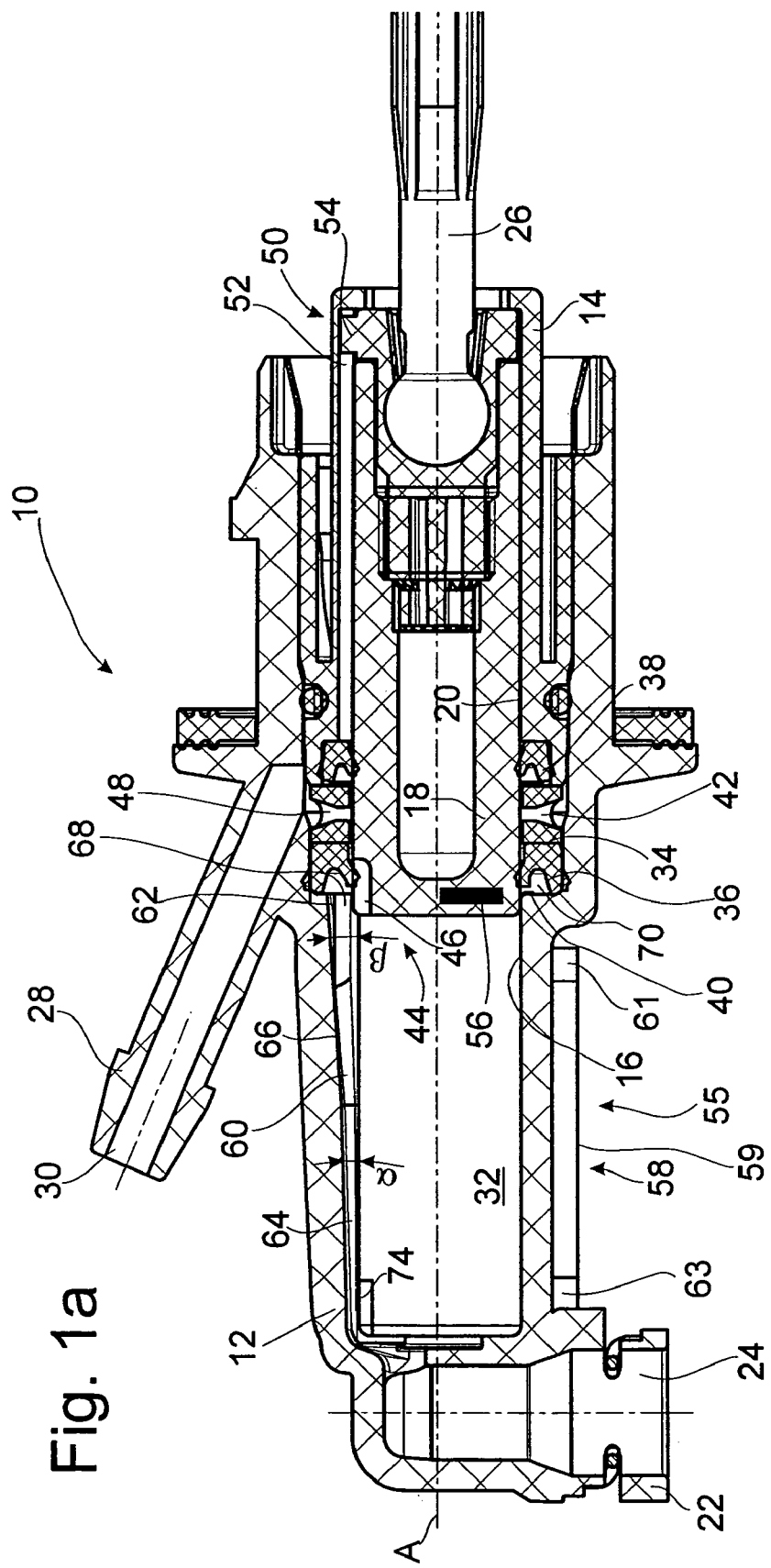
FIG. 1a is a view in axial section showing a hydraulic cylinder with an after-running device.

FIG. 1a shows a view in axial section of a hydraulic cylinder 10, according to the invention, which has an after-running device and is constructed as a master cylinder for a hydraulic actuator for actuating a motor vehicle clutch. The master cylinder 10 has a plastic housing 12 and a guide pipe 14 which is arranged in a stepped bore hole and fixedly connected to the housing 12, which jointly form a running sleeve 16 for a plastic piston 18 with a running surface 20 axially movable in the cylinder 10.

At its end, the housing 12 comprises a fluid connection 22 having a fluid channel 24 and communicating with respect to flow with a slave cylinder, not shown. The piston 18 of the master cylinder 10 is in operative connection with a clutch pedal, not shown, by means of a piston rod 26 that is swivelably arranged at the piston 18. When the clutch pedal is actuated, the piston rod 26 is displaced toward the left with reference to the drawing and, via the fluid connection, controls the slave cylinder and a clutch fork connected therewith for releasing the vehicle clutch.

Projecting from the jacket surface of the housing, is an after-running connection 28 which communicates, via an after-running channel 30 formed therein, with a fluid after-running vessel, not shown.

The end face of the piston 18 and the inner wall of the cylinder housing 12 define a variable pressure space 32 which is sealed from the atmosphere relative to the movable piston 18. For this purpose, two ring lip seals 36, 38 which are spaced apart by an intermediate ring 34 are arranged at the housing 12 and respectively contact the housing 12 by a sealing lip and the running surface 20 of the piston 18 by a second sealing lip. The first seal (primary seal 36) contacting a housing shoulder 40 axially between the after-running channel 30 and the pressure space 32 seals the pressure space 32 relative to an annular after-running area 42 formed by the intermediate ring 34. The second ring lip seal (secondary seal 38) located at the end of the guide pipe 14 serves to tightly separate the after-running area 42 from the atmosphere.

To ensure an after-running of hydraulic fluid into the pressure space 32 and the escape of gas bubbles from the pressure space 32, the master cylinder 10 has an after-running device 44 in the form of open compensating or after-running grooves 46 extending outward in axial direction from their end and are arranged at the piston running surface 20. This configuration is so selected that the primary seal 36 is bridged in the end position of the piston 18 shown in the drawing and a compensating channel 48 is released proceeding from the pressure space 32 via the after-running groove 46 to the after-running area 42 and onward to the after-running channel 30. The flow connection between the after-running area 42 and the after-running channel 30 and pressure space 32 is ensured by the channels in the intermediate ring 34, not visible in the drawing. When the piston 18 moves in the direction in which the pressure space 32 is reduced, the after-running groove 46 is moved out of the area of the primary seal 36 so that the primary seal 36 completely contacts the piston running surface 20 and therefore interrupts the connection between the pressure space 32 and the after-running channel 30. Instead of an open groove 46, the after-running device 44 can also be constructed at the position shown in the drawing as a closed groove, i.e., substantially as an axial bore hole which is connected to a lateral bore hole, i.e., a notch channel, that is guided radially outward. In the position of the piston shown in FIG. 1a, the notch channel opens into the after-running area 42 directly behind the sealing lip of the primary seal 36 cooperating with the piston 18.

As can be seen from FIG. 1a, the after-running groove 46 is arranged at the piston 18 in substantially the same circumferential position with respect to the housing 12 as the after-running channel 30 opening into the after-running area 42, so that the compensating channel 48 in the after-running area 42 is dimensioned as small as possible.

In order to retain the mutual rotational position of the after-running means, i.e., the compensating groove and the housing 12, the master cylinder 10 has rotation-locking means 50 with an axial guide groove 52 in the guide pipe 14 and a projection 24 at the piston 18 which engages in this axial guide groove 52 and is guided axially by it.

An optional venting groove 60 having a portion 62 close to the after-running channel 30 and a portion 64 remote of the after-running channel 30 is arranged in the upper wall of the pressure space for additional venting support. The portion 64 remote of the after-running channel 30 has a groove base 66 which slopes upward toward the after-running channel 30 relative to the horizontal by an angle $\alpha$ of 1.5°. The portion 62 close to the after-running channel 30 has a groove base 66 sloping upward relative to the horizontal toward the after-running channel 30 by an angle $\beta$ of about 5° and extends over approximately one third of the length of the pressure space 32. In particular, the portion 62 near the after-running channel 30 forms within the pressure space 32 a collecting portion 68 for gas bubbles which collect directly in front of the primary seal 36 and, in the position of the piston 18 shown in the drawing, in which the after-running groove 46 is located in the area of the primary seal 36, can escape via the after-running groove 46 and the after-running channel 30.

When there is negative pressure in the pressure space 32, additional hydraulic fluid flows into it via the after-running groove 46. The cross section of the after-running groove 46 advantageously corresponds at least to the cross section of the venting groove 60 in the area of the primary seal 36. This prevents a buildup at the compensating channel 48 during a venting process when there are relatively large accumulations of gas.

Figure 1B:
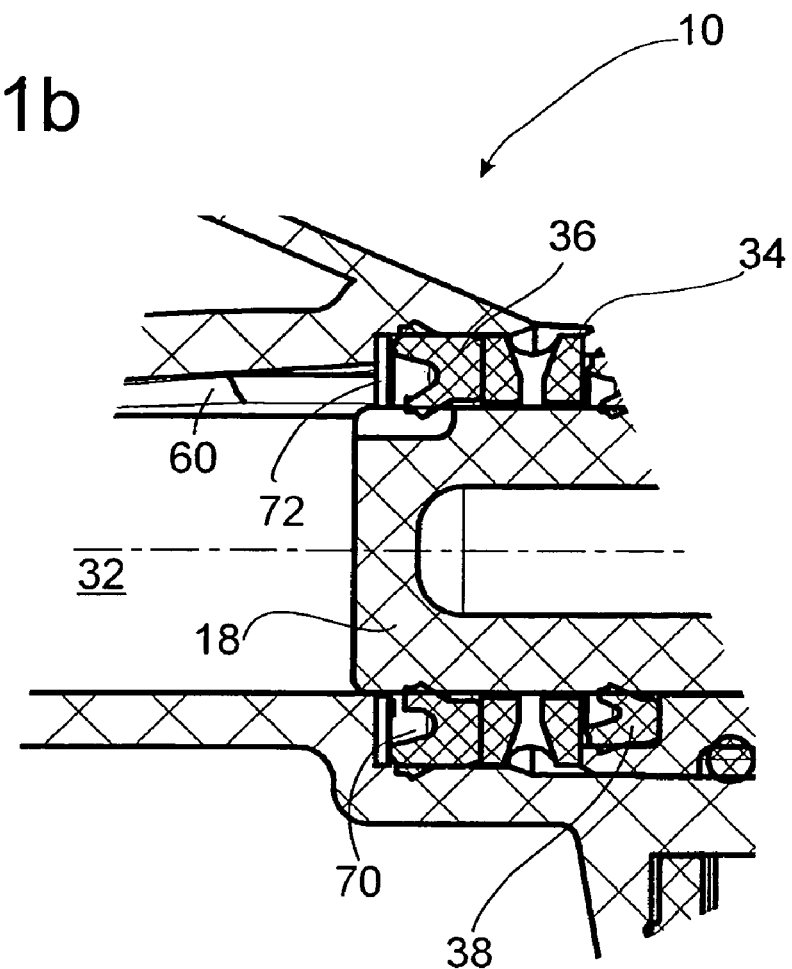
FIG. 1b shows a section of the hydraulic cylinder from FIG. 1a with a ring disk arranged in the area of the primary seal.

In order to prevent residual gas from passing out of the pressure space 32 into the ring groove 70 defined by the sealing lips of the primary seal 36, an additional cover element 72, e.g., a ring disk 72, can be introduced to cover the ring groove 70 as is shown in the section in FIG. 1b. For this purpose, the ring disk 72 is received by the housing 12 so as to be centered between the primary seal 36 and the shoulder 40, the inner diameter of the ring disk 72 being so dimensioned that the running surface 20 of the piston 18 can slide past without contact.

The hydraulic cylinder 10 is intended to be installed in a horizontal position. The center axis A of the hydraulic cylinder 10 corresponds to the horizontal. The hydraulic cylinder 10 can also be arranged with its connection 22 for the pressure line so as to be inclined upward relative to the horizontal at an angle smaller than or equal to α.

As an alternative to the construction of an individual after-running groove 46, the piston 18 can also have a plurality of such grooves 46. The after-running groove or grooves 46 is or are preferably formed at the piston 10 at the geodetically highest area and adjacent to the gas collecting portion 68. In the horizontal position shown in the drawing, the after-running grooves 46 are positioned in the upper half-plane of the piston 18 and, particularly preferably, close to the after-running channel 30 and advantageously also in the area of the venting groove 60.

In addition, one or more after-running grooves 46 can also be formed outside the piston area cooperating with the gas collecting portion 68. However, the after-running grooves 46 in their entirety are to be arranged and dimensioned in such a way that the action described in the following can take place during venting.

During a venting process with the piston moving into the pressure space 32, fluid is displaced in the geodetically upper volume area of the pressure space 32 when there is an accumulation of gas present in the venting groove 60 or when this venting groove 60 is absent, and this results in a rising fluid level because the fluid can only escape from the pressure space at an insufficient rate by way of the after-running grooves, which may possibly be arranged outside the gas collecting portion 68. Consequently, the gases present in the gas collecting portion 68 are initially compressed and then pushed or pressed out of the pressure space 32 along with the excess, displaced fluid via the after-running means 46 which are directly adjacent to this gas collecting portion 68, i.e., there is a direct flow connection between them in this state.

In order to achieve the fullest possible degassing of the pressure space 32, it is particularly important that the flow rate of the fluid in the after-running groove or grooves 46 be adjusted as high as possible, which can be effected in a simple manner with a given piston cross section by suitable selection of the groove cross section in connection with the quantity of grooves.

A short, axially extending web 74 may be formed in addition at the end side of the pressure space 32. When the pushed in piston 18 reaches its end position, this web 74 positively engages in the after-running groove 46 and gas accumulations which build up in the after-running groove but which can no longer be guided out through the primary seal 36 after passing the latter are displaced out of the groove 46, whereupon these gas accumulations escape into the venting groove 60 and can rise therein in the direction of the primary seal 36 so as to escape from the pressure space 32 during the next venting process.

According to FIG. 1a, the hydraulic cylinder 10 comprises a sensor system 55 for detecting a piston position. For this purpose, a bar-shaped permanent magnet 56 is arranged at the piston 18 and a detector unit 58 is arranged at the outer side of the housing 12 or, alternatively, at the guide sleeve 14 for detecting a change in the magnetic field induced by the permanent magnet 56.

The detector unit 58 comprises a sensor housing 59 containing two sensors 61, 63 that are sensitive to magnetic fields, e.g., Hall sensors or reed contacts. Alternatively, continuously operating capacitive or inductive displacement transducers can also be used as sensors. The axial positioning of the permanent magnet 56 at the piston 18 can be freely selected in principle, but is minimized to the shown position of the axial distance of the magnet 56 from the pressure space 32, resulting in a design advantage in the positioning of the sensors 61, 63 and of the sensor housing 59 which can be constructed in a space-saving manner in the front area of the cylinder housing 12 and accordingly directly axially in the area of the pressure space 32. The permanent magnet 56 and the sensors 61, 63 are located substantially in the same circumferential position. The magnet 56 is advantageously oriented with one of its two magnetic poles toward the sensors 61, 63 so that the latter can be acted upon by the magnetic field which is particularly pronounced at that location.

The axial distance between the sensors 61, 63 corresponds approximately to a starting position and end position of the piston 18. In FIG. 1a, the piston 18 is located axially remote of the position of the sensor 61, but still within its detection range. When the piston 18 carries out an axial movement in its running sleeve 16, the sensor 24 or 26 lying closest to the permanent magnet 56 axially is acquired by its magnetic field and can then execute a switching movement and/or generates an electric signal which is conveyed to an evaluating unit by means of a signal line, not shown, for further processing. Both sensors 61, 63 can also be acted upon simultaneously by the magnetic field of the permanent magnet 56, and the position of the piston 18 can be determined from the resulting signal ratio of the sensors 61, 63.

As can be seen from the drawing, the permanent magnet 56, which is completely surrounded by the plastic material of the piston 18 is inserted therein asymmetric to the center line A of the piston and cylinder, which piston 18 is guided in the running sleeve 16 so as to be fixed with respect to rotation. Accordingly, on the one hand, the magnet 56 is reliably protected against corrosion and, on the other hand, the running surface 20 of the piston 18 is not interrupted, which ensures a low-wear and long-lived operation of the hydraulic cylinder 10.

Figure 2:
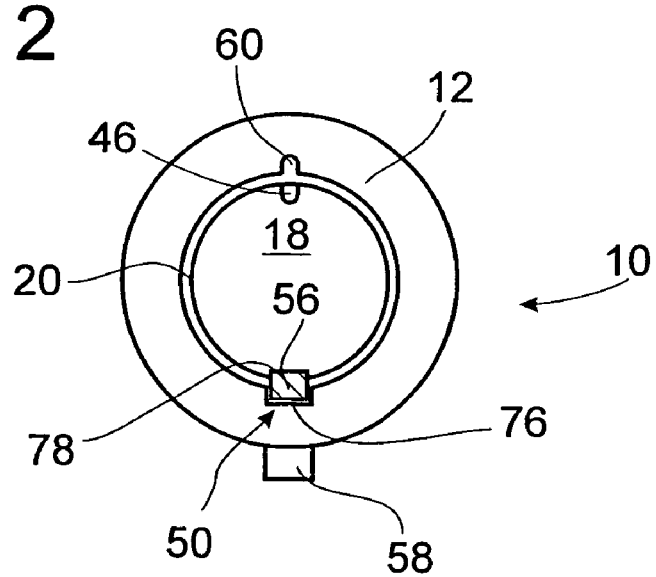
FIG. 2 is a schematic and view showing the arrangement of a permanent magnet at a piston of a hydraulic cylinder in radial section.

For arranging the permanent magnet 56 in the hydraulic cylinder 10, the rotation-locking device 50 can be constructed alternatively so as to act in cooperation with the hydraulic cylinder 10 itself as is shown in FIG. 2. For this purpose, the magnet 56 is inserted into the piston 18 in such a way that it projects out of the latter radially somewhat beyond the piston running surface 20. The projecting area of the magnet 56 engages in an axial groove 76 formed in the pressure space 32 and is held by this axial groove 76 so as to prevent rotation. It is sufficient, for example, to provide a recess 78 as receiving area 78 at the running surface 20 and to insert a disk-shaped permanent magnet 56 therein. Since this permanent magnet 56 is guided in the groove 76, it is prevented at the same time from falling out in the assembled state of the cylinder 10, i.e., in order to mount the permanent magnet 56, the latter need only be fixed in the recess 78. However, axial play between the magnet 56 and its receiving area 78 should be avoided because it works against an exact detection of the position of the piston 18.

The variant described above has the advantage that the projection 54 at the piston 18 can be dispensed with and the permanent magnet 56 can be guided substantially closer to the detector unit 58 than was previously known. This results in the additional advantage of a more compact construction and, at the same time, the detector unit 58 does not have to be as sensitive.

Figure 3:
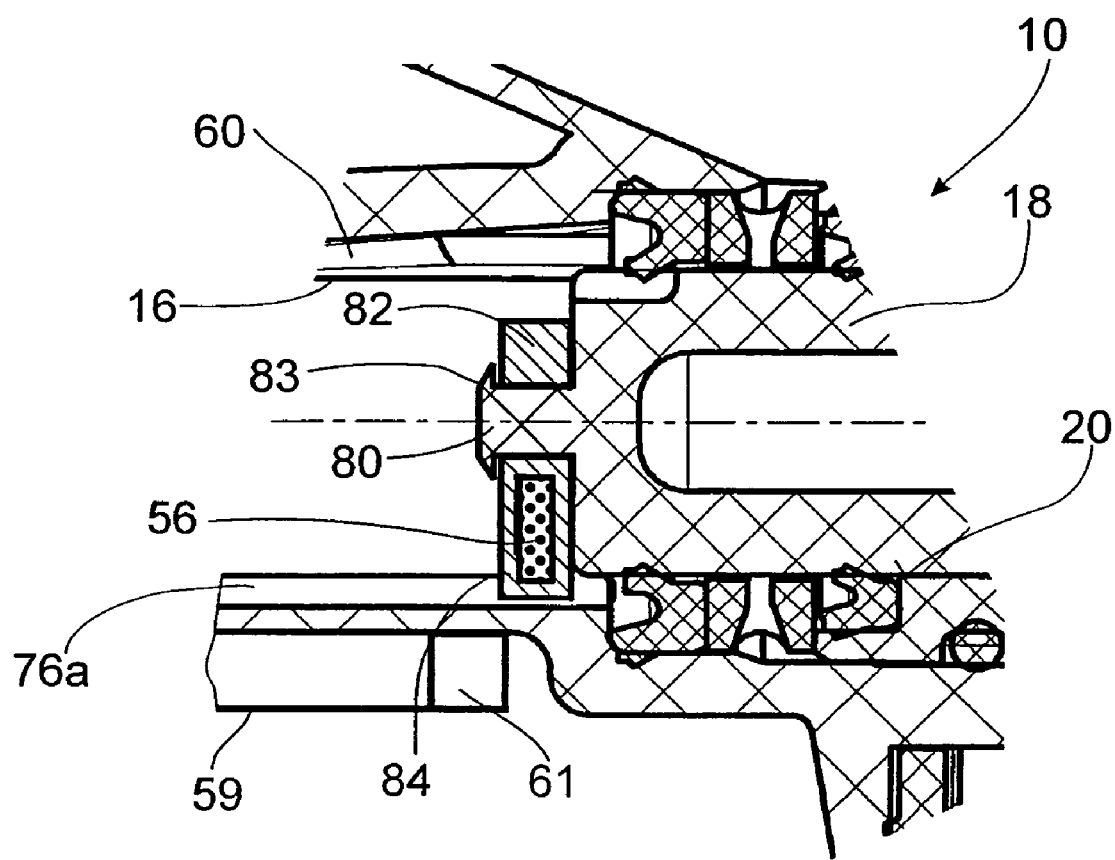
FIG. 3 is a section view showing another variant of the arrangement of a permanent magnet at a piston.

Alternatively, as is shown in section in FIG. 3, the permanent magnet 56 can also be arranged at an axial continuation 80 of the pressure space 32 formed at the piston 18. A receiving element 82 which is preferably made of plastic is mounted on the axial continuation 80 so as to be freely rotatable but axially fixed. For this purpose, the receiving element 82 can be nondetachably secured to the piston 18 with the least possible axial play by means of a one-way catch connection, a snap connection or other retaining means 83. The receiving element 82 has a radially projecting projection 84 or pin which projects over the running surface 20 of the piston 18 and which can engage in an axial groove 76a formed across from the venting groove 60 at the pressure space 32. The magnet 56 is preferably cast integral with the receiving element 82, but other, alternative fastening methods are possible, e.g., recessing, snapping in, or pressing into a recess, as is shown in FIG. 2, a catch connection, or the like.

In this variant, which is especially useful as a slave cylinder, the piston 18 remains freely rotatable insofar as it is not limited in some other way, and only the receiving element 82 and magnet 56 are fastened so as to be fixed with respect to rotation relative to the housing 12 and, therefore, to the sensors 61, 63.

A particularly suitable material for the permanent magnet 56 is an alloy of the iron-neodymium-boron (FeNdB) material system, by means of which a particularly high magnetic flux density can be achieved. When the magnet material directly contacts the fluid, application of a protective layer, e.g., a nickel coating, is recommended to prevent surface corrosion.

Due to the asymmetric arrangement of the permanent magnet 56, the detector unit 58, in its entirety, can be produced very compactly and economically using a substantially smaller amount of costly magnet material.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hydraulic cylinder for use as a master cylinder for actuating a motor vehicle clutch, said cylinder comprising:
    a housing having a fluid connection for connecting to a hydraulic system and an after-running connection for connecting to a fluid after-running vessel;
    a piston which is axially displaceable in the housing to define a variable pressure space having a gas collecting portion, the piston being fixed against rotation in the housing and having at least one after-running groove which is oriented substantially toward the gas collecting portion; and
    a primary seal arranged in the housing and receiving the piston therethrough, said primary seal being bridged by said after-running groove when said piston is in an extended end position,
    whereby said gas collecting portion of said pressure space communicates with said after-running connection when said piston is in said extended end position.

2. The hydraulic cylinder of claim 1 wherein the after-running groove is an open groove.

3. The hydraulic cylinder of claim 1 wherein only one after-running groove is provided.

4. The hydraulic cylinder of claim 1 wherein the housing comprises a venting groove which forms said gas collecting portion of said pressure space.

5. The hydraulic cylinder of claim 4 wherein said venting groove has a base which slopes upward, relative to the axial displacement path of the piston, toward the after-running connection.

6. The hydraulic cylinder of claim 1 wherein said primary seal is a lip seal having a ring groove facing said pressure space, said cylinder further comprising an annular cover element interposed between said lip seal and said pressure space.

7. The hydraulic cylinder of claim 1 wherein the at least one after-running groove is oriented substantially toward the after-running connection.

8. The hydraulic cylinder of claim 1 further comprising a secondary seal arranged in said housing and receiving the piston therethrough, said secondary seal and said primary seal defining therebetween an after-running area which communicates with said after-running channel.

9. The hydraulic cylinder of claim 1 further comprising a secondary seal arranged in said housing and receiving the piston therethrough, said secondary seal and said primary seal defining therebetween an after-running are which communicates with said after-running channel.

10. A hydraulic cylinder for use as a master cylinder for actuating a motor vehicle clutch, said cylinder comprising:
    a housing having a fluid connection for connecting to a hydraulic system and an after-running connection for connecting to a fluid after-running vessel;
    a piston which is axially displaceable in the housing to define a variable pressure space having a venting groove, the piston being fixed against rotation in the housing and having at least one after-running groove which is oriented substantially toward the venting groove; and
    a primary seal arranged in the housing and receiving the piston therethrough, said primary seal being bridged by said after-running groove when said piston is in an extended end position,
    whereby said venting groove of said pressure space communicates with said after-running connection when said piston is in said extended end position.

11. The hydraulic cylinder of claim 10 wherein the after-running channel is an open groove.

12. The hydraulic cylinder of claim 10 wherein only one after-running channel is provided.

13. The hydraulic cylinder of claim 10 wherein said venting groove has a base which slopes upward, relative to the axial displacement path of the piston, toward the after-running connection.

14. The hydraulic cylinder of claim 10 wherein said primary seal is a lip seal having a ring groove facing said pressure space, said cylinder further comprising an annular cover element interposed between said lip seal and said pressure space.

15. The hydraulic cylinder of claim 10 wherein the at least one after-running groove is oriented substantially toward the after-running connection.

* * * * *